United States Patent
Altintas et al.

(10) Patent No.: US 11,388,627 B2
(45) Date of Patent: Jul. 12, 2022

(54) VEHICULAR MICRO CLOUD TRANSMISSION CONTROL PROTOCOL

(71) Applicant: Toyota Motor Engineering & Manufacturing North America, Inc., Plano, TX (US)

(72) Inventors: Onur Altintas, Mountain View, CA (US); Takamasa Higuchi, Mountain View, CA (US); Seyhan Ucar, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 149 days.

(21) Appl. No.: 16/988,972

(22) Filed: Aug. 10, 2020

(65) Prior Publication Data
US 2022/0046468 A1    Feb. 10, 2022

(51) Int. Cl.
| H04W 28/04 | (2009.01) |
| H04W 4/44 | (2018.01) |
| H04W 4/46 | (2018.01) |
| H04L 67/1074 | (2022.01) |
| H04L 67/1087 | (2022.01) |
| H04W 76/10 | (2018.01) |
| H04W 80/06 | (2009.01) |
| H04W 84/18 | (2009.01) |

(52) U.S. Cl.
CPC ........... *H04W 28/04* (2013.01); *H04L 67/108* (2013.01); *H04L 67/1091* (2013.01); *H04W 4/44* (2018.02); *H04W 4/46* (2018.02); *H04W 76/10* (2018.02); *H04W 80/06* (2013.01); *H04W 84/18* (2013.01)

(58) Field of Classification Search
None
See application file for complete search history.

(56) References Cited

U.S. PATENT DOCUMENTS

| 7,899,045 B2 | 3/2011 | Shankara |
| 9,749,175 B2 | 8/2017 | Kuriakose et al. |

(Continued)

OTHER PUBLICATIONS

Narayanaswamy, K., "Vehicular Micro Cloud Prototype Implementation," Master's Thesis (Masterarbeit), Heinz Mixdorf Institute, Paderborn University, Germany, Mar. 2019, 60 pages.

(Continued)

*Primary Examiner* — Robert M Morlan
(74) *Attorney, Agent, or Firm* — Christopher G. Darrow; Darrow Mustafa PC

(57) ABSTRACT

A system and related method for transmitting data to one or more connected vehicles. The system includes one or more processors and a memory. The memory includes one or more modules that cause the one or more processors to establish a communication connection between the system and one or more of the connected vehicles, the connected vehicles forming a vehicular micro cloud and having a shared identification, send a first portion of data to one or more of the connected vehicles, the data having the first portion and a remaining portion, receive acknowledgment data from one or more of the connected vehicles, the acknowledgment data including the shared identification, validate the acknowledgment data, and in response to the acknowledgment data being validated, send the remaining portion of data to one or more of the connected vehicles.

20 Claims, 8 Drawing Sheets

(56) References Cited

U.S. PATENT DOCUMENTS

| | | | |
|---|---|---|---|
| 10,171,959 B2 | 1/2019 | Kish | |
| 2011/0216685 A1* | 9/2011 | Kish | H04W 28/04 370/312 |
| 2018/0254915 A1 | 9/2018 | Sosnowski et al. | |
| 2019/0132819 A1 | 5/2019 | Tseng et al. | |
| 2021/0127381 A1* | 4/2021 | Ryu | H04L 1/1607 |
| 2021/0360431 A1* | 11/2021 | Li | H04W 16/14 |

OTHER PUBLICATIONS

Vijayalakshmi, M. et al., "Cluster based Multicast Adhoc on Demand Routing Protocol for increasing Link Stability in Manets," Global Journal of Computer Science and Technology: E Network, Web & Security, vol. 17, Issue 2, Version 1.0 (2017) pp. 1-13.

Kandala, S., "Acknowledgment for Multicast Streams," Whitepaper—Sharp Laboratories of America, Inc. (Jul. 2001) 10 pages.

Adamson, B., "Multicast Negative-Acknowledgment (NACK) Building Blocks," Nov. 2008.

* cited by examiner

VEHICULAR MICRO CLOUD TRANSMISSION CONTROL PROTOCOL

TECHNICAL FIELD

The subject matter described herein relates, in general, to systems and methods for transmitting data between servers and members of a vehicular micro cloud.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some connected vehicles can form clusters of interconnected vehicles that may be located within a similar geographic location. Such clusters are known as "vehicular micro clouds." Servers can transmit and receive data from connected vehicles that are members of the vehicular micro cloud. Some servers may transmit data to members of the vehicular micro cloud by sending the data to a single member of the vehicular micro cloud, whereupon receiving the data, the single member can then transmit the data to the other members of the vehicular micro cloud.

Some servers may track downstream transmission errors and may stop transmission upon detecting a transmission error, which may lead to delays or transmission failures.

SUMMARY

This section generally summarizes the disclosure and is not a comprehensive explanation of its full scope or all its features.

In one embodiment, a method for transmitting data between a server and one or more of a plurality of connected vehicles includes the steps of establishing a communication connection between the server and the one or more of the plurality of connected vehicles, sending a first portion of data to the one or more of the plurality of connected vehicles, receiving acknowledgment data from the one or more of the plurality of connected vehicles, validating the acknowledgment data, and in response to the acknowledgment data being validated, sending a remaining portion of data to the one or more of the plurality of connected vehicles.

The plurality of connected vehicles form a vehicular micro cloud and have a shared identification. The data includes the first portion and the remaining portion. The acknowledgment data includes the shared identification.

In another embodiment, a system for transmitting data to one or more of a plurality of connected vehicles includes one or more processors and a memory in communication with the one or more processors. The memory includes an establish module, a send module, a receive module, and a validate module. The establish module includes instructions that, when executed by the one or more processors, cause the one or more processors to establish a communication connection between the system and the one or more of the plurality of connected vehicles. The plurality of connected vehicles form a vehicular micro cloud and have a shared identification.

The send module includes instructions that, when executed by the one or more processors, cause the one or more processors to send a first portion of data to the one or more of the plurality of connected vehicles. The data includes the first portion and a remaining portion. The receive module includes instructions that, when executed by the one or more processors, cause the one or more processors to receive acknowledgment data from the one or more of the plurality of connected vehicles. The acknowledgment data includes the shared identification.

The validate module includes instructions that, when executed by the one or more processors, cause the one or more processors to validate the acknowledgment data. The send module further includes instructions that, when executed by the one or more processors, cause the one or more processors to, in response to the acknowledgment data being validated, send the remaining portion of data to the one or more of the plurality of connected vehicles.

In yet another embodiment, a data transmission system for a connected vehicle includes one or more processors and a memory in communication with the one or more processors. The memory includes a connect module, a receive module, and an acknowledgment module. The connect module includes instructions that, when executed by the one or more processors, cause the one or more processors to join a vehicular micro cloud. The vehicular micro cloud includes a plurality of connected vehicles and the connected vehicle. The plurality of connected vehicles have a shared identification. The receive module includes instructions that, when executed by the one or more processors, cause the one or more processors to receive a first portion of data from a server. The data includes the first portion and a remaining portion.

The acknowledgment module includes instructions that, when executed by the one or more processors, cause the one or more processors to, in response to receiving the first portion of data, send acknowledgment data to the server. The acknowledgment data includes the shared identification. The receive module further includes instructions that, when executed by the one or more processors, cause the one or more processors to receive the remaining portion of data.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
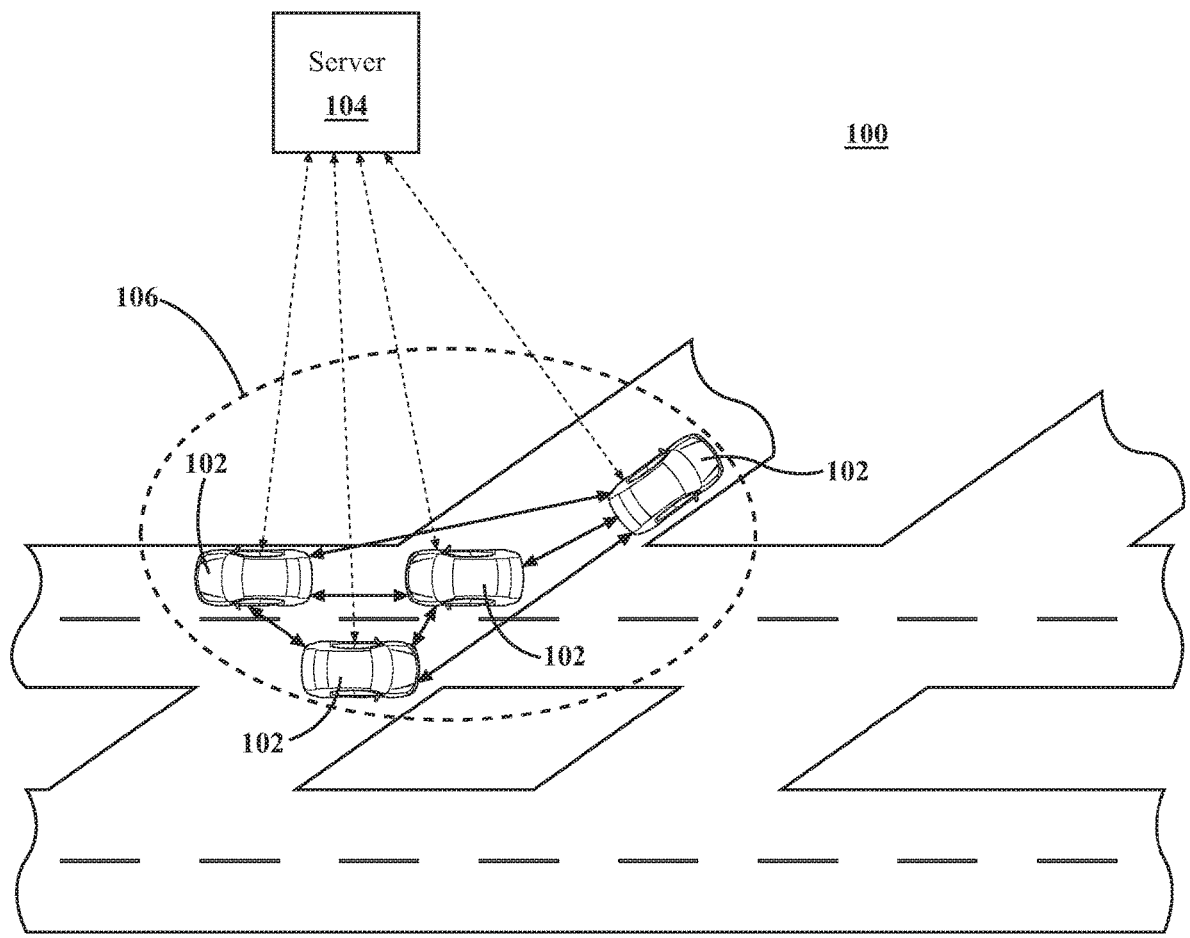
FIG. 1 is an example of a vehicular micro cloud group transmission control protocol system.

Systems, methods, and other embodiments associated with transmitting data between server(s) and connected vehicle(s), where the connected vehicle is a member of a group of interconnected vehicles, are disclosed. The interconnected vehicle(s) may wirelessly receive from server(s) and/or other interconnected vehicle(s) data such as software updates, map updates, video files, audio files, traffic data, text files, etc.

Past methods to address this issue have included a server transmitting data to a single connected vehicle, and the single connected vehicle then transmitting the data to other interconnected vehicles. Another past method includes the server transmitting different portions of data to different interconnected vehicles. Upon receiving a portion of data from the server, the interconnected vehicle may transmit the received portion to other interconnected vehicles, and may receive other portions from other interconnected vehicles.

In these past methodologies, where the server transmits data or a portion of data to one of the interconnected vehicles, the server may halt or delay transmission when a transmission error is detected, and may not resume transmission until the transmission error is resolved.

Example systems and methods disclosed herein relate to a server transmitting data to all the interconnected vehicles, to increase the chances of data being successfully received by the interconnected vehicles.

In one approach, a system includes a server and a group of interconnected vehicles. The interconnected vehicles are members of a vehicular micro cloud that may communicate with each other using vehicle-to-vehicle (V2V) communication, and share a common identification. The identification may be based on an identification for the vehicular micro cloud.

The server establishes individual communication connections with the interconnected vehicles. The server transmits a portion of data to all the interconnected vehicles, and waits to receive acknowledgment from one or more of the interconnected vehicles. The acknowledgment, which includes the shared identification, indicates to the server that the portion of data has been successfully received by one or more interconnected vehicles. Upon receiving the acknowledgment, the server transmits a remaining portion of data and may not request further acknowledgment from the rest of the interconnected vehicles.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicular micro cloud group transmission control protocol (TCP) system 100 is shown. The TCP system 100 may include various elements, which may be communicatively linked in any suitable form. As an example, the elements may be connected, as shown in FIG. 1. Some of the possible elements of the TCP system 100 are shown in FIG. 1 and will now be described. It will be understood that it is not necessary for the TCP system 100 to have all the elements shown in FIG. 1 or described herein. The TCP system 100 may have any combination of the various elements shown in FIG. 1. Further, the TCP system 100 may have additional elements to those shown in FIG. 1. In some arrangements, the TCP system 100 may not include one or more of the elements shown in FIG. 1. Further, it will be understood that one or more of these elements may be physically separated by large distances.

The elements of the TCP system 100 may be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the TCP system 100 may include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The TCP system 100 can include one or more connected vehicles 102. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle can be any other type of vehicle that may be used on a roadway, such as a motorcycle. In some implementation, the vehicle can be a watercraft, an aircraft, or any other form of motorized transport. The connected vehicle 102 can be a vehicle that is communicatively linked to one or more elements of the TCP system 100 (e.g., server(s) 104). As such, a non-connected vehicle can be a vehicle that is not communicatively linked to one or more elements of the TCP system 100 (e.g., server(s) 104).

The TCP system 100 can include one or more vehicular micro cloud(s) 106. The vehicular micro cloud 106 is a wireless network system in which a plurality of the connected vehicles 102, and optionally, devices such as non-vehicle node, form a cluster of interconnected member vehicles. The interconnected vehicles 102 are interconnected via Wi-Fi, mmWave, DSRC, V2V communication, or some other form of vehicle-to-everything (V2X) wireless communication. The interconnected vehicles 102 may include one or more coordinator vehicles of the vehicular micro cloud 106. The coordinator vehicle is the vehicle that forms the vehicular micro cloud 106 and/or manages how the computing resources of the vehicular micro cloud 106 are utilized by the members of the vehicular micro cloud 106. The coordinator vehicle may generate vehicular micro cloud identification. As an example, the coordinator vehicle may randomly generate the vehicular micro cloud identification.

As previously mentioned, the connected vehicles 102 in the vehicular micro cloud 106 can wirelessly communicate with one another, reading and writing data among themselves using as an example, vehicle-to-vehicle (V2V) communication. Further, the connected vehicles 102 in the vehicular micro cloud 106 may have a shared identification. In other words, the connected vehicles 102 in the vehicular micro cloud 106 may have a common identification value. The member vehicles and/or the coordinator vehicle may generate the shared identification based on the vehicular micro cloud identification. Alternatively, the member vehicles and/or the coordinator vehicle may generate the shared identification based on vehicle identification such as VIN numbers and/or vehicle IP addresses of the member vehicles.

The vehicular micro cloud 106 may be a stationary vehicular micro cloud such that the geographic location of the vehicular micro cloud 106 is static. In such a case, connected vehicles 102 may join and exit the vehicular micro cloud 106 over time. Alternatively, the vehicular micro cloud 106 may be a mobile vehicular micro cloud such that the geographic location of the vehicular micro cloud 106 moves relative to the environment. In such a case, the member vehicles and the vehicular micro cloud 106 may travel together.

The TCP system 100 can include one or more servers 104. The server(s) 104 may be cloud-based server(s) or edge-based server(s). The server(s) 104 can communicate with one or more connected vehicles 102 over a communication module, such as by any type of vehicle-to-cloud (V2C) communications, now known or later developed. The server(s) 104 can receive data from and send data to the connected vehicle(s) 102. The data may include a first portion and a remaining portion. One or more of the first portion of data and the remaining portion of data may be one or more data packets. The data may be of any suitable type or format. As an example, the data may be in a packet format with a header section and a payload section. The data may be any type of data, such an image, an audio file, and/or text. As an example, the server(s) 104 may send map updates and other software updates to the connected server(s) 104. The sending and/or receiving may occur on any suitable basis (e.g., continuously, periodically, irregularly, in response to a command or input, randomly, etc.).

The various elements of the TCP system 100 will be discussed in turn below in connections with FIGS. 2-4. It will be understood that it is not necessary for these elements to have all the sub-elements shown in FIGS. 2-4 or described herein. Further, there can be additional sub-elements to those shown in FIGS. 2-4. Further, while the various sub-elements may be shown as being located on or within the associate element in FIGS. 2-4, it will be understood that one or more of these sub-elements can be located external to the associated element or even remote from the associated element.

Figure 2:
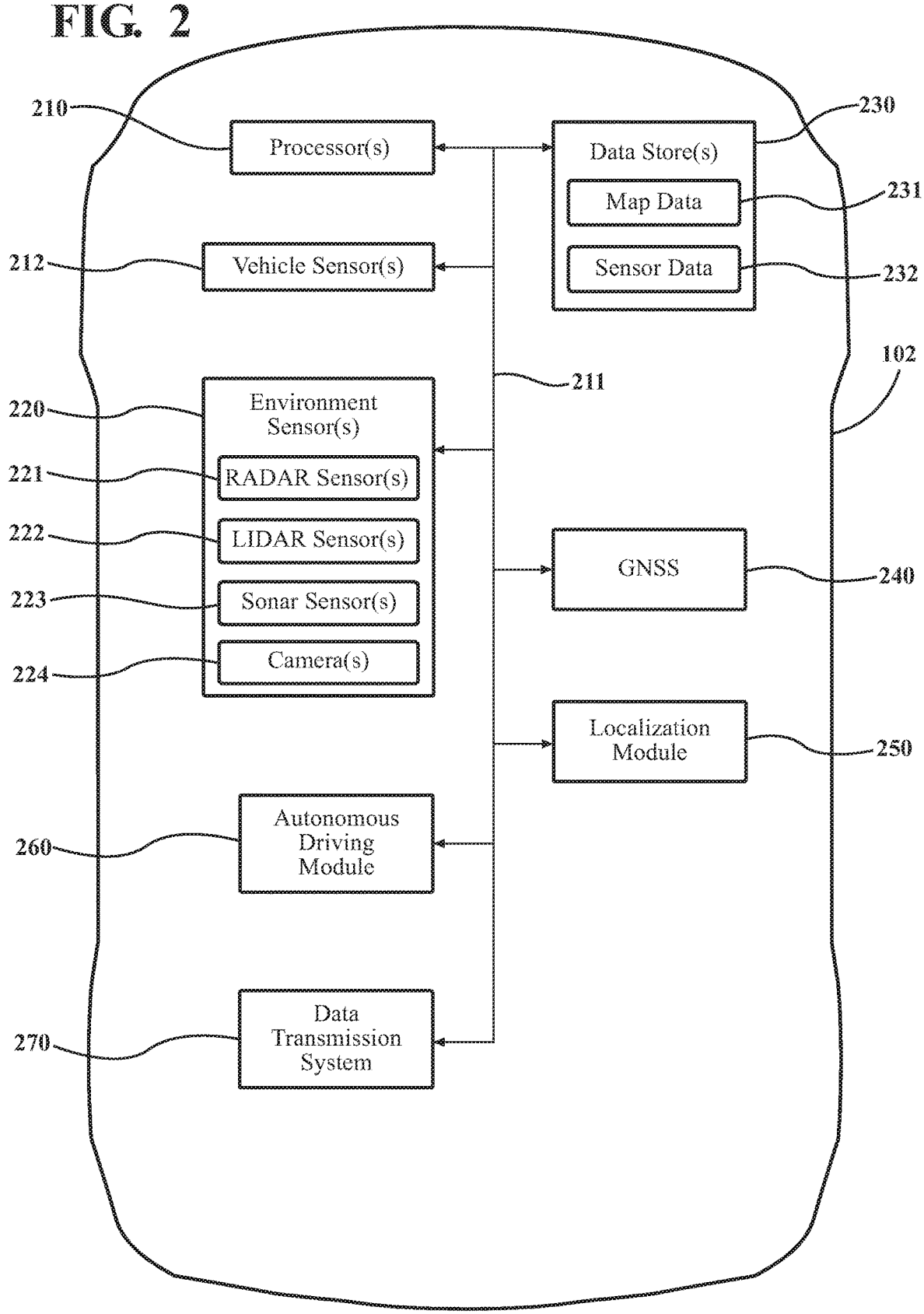
FIG. 2 illustrates a block diagram of a connected vehicle incorporating a data transmission system.

Referring to FIG. 2, an example of a connected vehicle 102 incorporating a data transmission system is illustrated. As stated previously, a "vehicle" is any form of powered transport. In one or more implementations, the connected vehicle 102 is an automobile. While arrangements will be described herein with respect to automobiles, it will be understood that embodiments are not limited to automobiles. In some implementations, the connected vehicle 102 may be any form of powered transport that, for example, transports occupants, and thus benefits the functionality discussed herein. Additionally, the connected vehicle 102 could be an autonomous vehicle, a semi-autonomous vehicle, a nonautonomous vehicle, or combinations thereof.

The connected vehicle 102 also includes various elements. It will be understood that in various embodiments, the connected vehicle 102 may not have all the elements shown in FIG. 2. The connected vehicle 102 can have different combinations of the various elements shown in FIG. 2. Further, the connected vehicle 102 can have additional elements to those shown in FIG. 2. In some arrangements, the connected vehicle 102 may be implemented without one or more of the elements shown in FIG. 2. While the various elements are shown as being located within the connected vehicle 102 in FIG. 2, it will be understood that one or more of these elements can be located external to the connected vehicle 102. Further, the elements shown may be physically separated by large distances and provided as remote services (e.g., cloud-computing services).

In any case, the connected vehicle 102 may include one or more processor(s) 210. The processor(s) 210 may be located within the connected vehicle 102 or may be located external to the connected vehicle 102 and may assist and/or perform the processing any of the methods disclosed in this specification. The processor(s) 210 may be connected to one or more data buses 211 that allow the processor(s) 210 to communicate with one or more vehicle systems. For example, the processor(s) 210 may have the ability to communicate with one or more vehicle sensors 212, such as vehicle sensors that may include several different sensors for measuring any one of several different variables. For example, the vehicle sensors 212 can include sensors regarding acceleration, steering wheel angle, velocity, and other forces acting on or generated by the connected vehicle 102.

The connected vehicle 102 may also include several environment sensors 220. The environment sensors 220 are capable of detecting objects or perform other measurements of the environment that surrounds the connected vehicle 102. For example, the environment sensors 220 could include radar sensor(s) 221, LIDAR sensor(s) 222, sonar sensor(s) 223, and camera(s) 224. The purpose of the sensors making up the environment sensors 220 is to detect objects and/or the environment external to the connected vehicle 102.

The connected vehicle 102 may also include one or more data stores 230. The one or more data stores 230 may include map data 231 for one or more roads that the connected vehicle 102 may travel upon. The map data 231 may include high definition maps (HD maps) that may be detailed down to the centimeter scale. As such, HD maps may provide information about lane placement, road boundaries, the severity of curves, the gradient of the road, etc. Some of this information could include lane marking points to indicate the markings of one or more lanes, such as the centerline of a lane and/or the perimeter of lanes, etc.

The one or more data stores 230 may include sensor data 232. In this context, "sensor data" means any information about the sensors that the connected vehicle 102 is equipped with, including the capabilities and other information about such sensors. The sensor data 232 can relate to one or more vehicle sensors 212 and/or environment sensors 220. As an example, in one or more arrangements, the sensor data 232 can include information on one or more LIDAR sensors 222 of the environment sensors 220. In some instances, at least a portion of the sensor data 232 can be located in one or more data stores 230 located onboard the connected vehicle 102. Alternatively, or in addition, at least a portion of the sensor data 232 may be located in one or more data stores that are located remotely from the connected vehicle 102.

The connected vehicle 102 may also include a global navigation satellite system (GNSS) 240 that can receive signals from satellites and determine the approximate location of the connected vehicle 102. Anyone of several different GNSS systems may be utilized, such as Global Positioning System (GPS), Galileo, GLONASS, BeiDou, Quasi-Zenith Satellite System (QZSS), and the like. The GNSS 240 may provide information regarding the location of the connected vehicle 102, the trajectory of the connected vehicle 102, timestamp information, and the like. The GNSS 240 may also be able to utilize this information to determine the speed, acceleration, trajectory, elevation, and other details regarding the activity and/or location of the connected vehicle 102.

As such, the connected vehicle 102 may include a localization module 250 that is able to determine the location of the connected vehicle 102 in a two dimensional and/or three-dimensional space. The localization module 250 may utilize information from the GNSS 240 as well as from the vehicle sensors 212 and/or the environment sensors 220 to determine the location of the connected vehicle 102.

The connected vehicle 102 may also include a data transmission system 270 that may receive data from and send data to server(s) 104 and other connected vehicle(s) 102.

The connected vehicle 102 may also include an autonomous driving module 260 that can pilot the connected vehicle 102 in an autonomous manner to a destination. In order to do this, the autonomous driving module 260 may use information from the vehicle sensor(s) 212, the environment sensor(s) 220, the data store(s) 230, the GNSS 240, the localization module 250 and/or the data transmission system 270 to pilot the connected vehicle 102 to one or more destinations in a safe manner.

Figure 3:
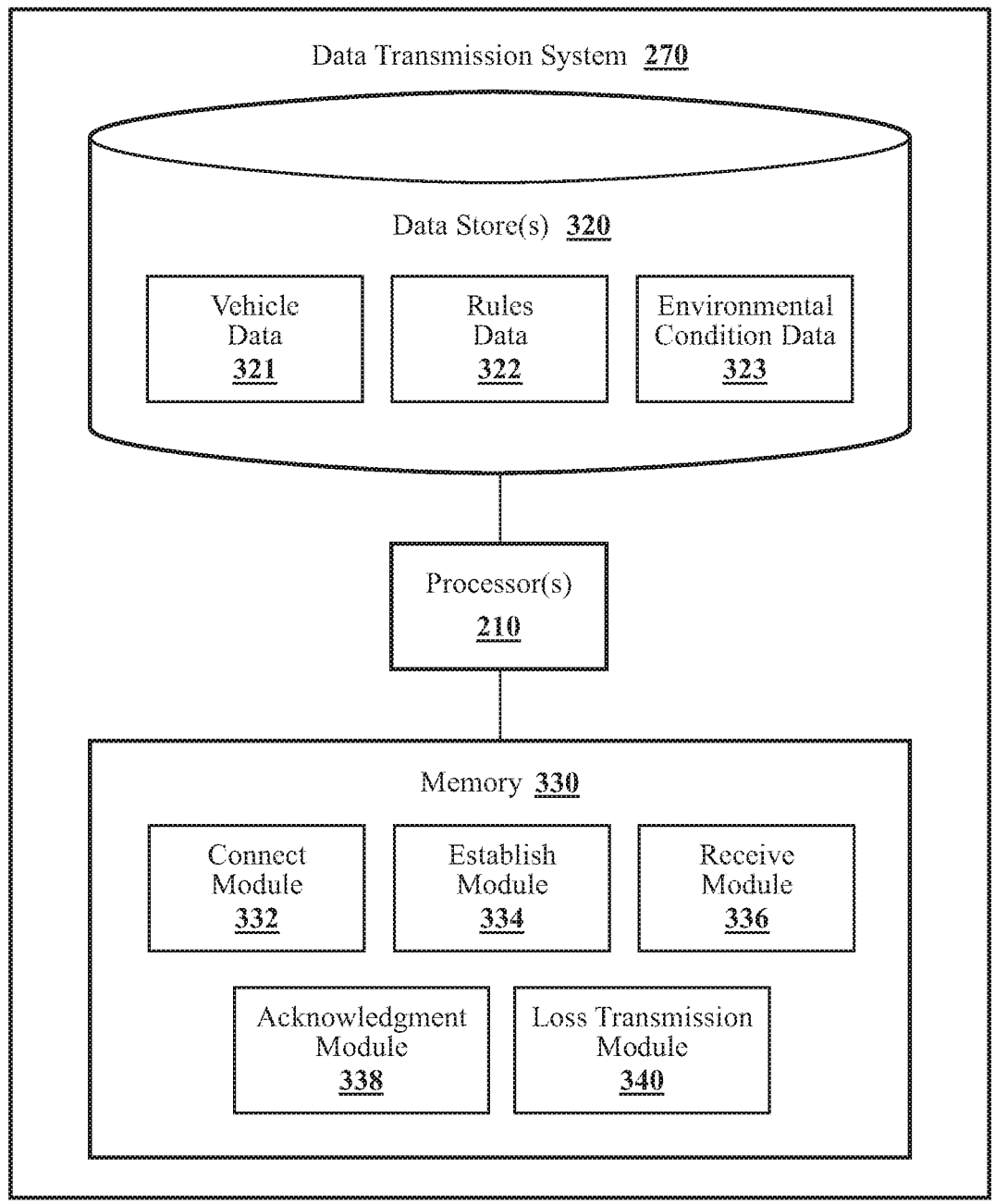
FIG. 3 is a more detailed block diagram of the data transmission system of FIG. 2.

With reference to FIG. 3, a more detailed block diagram of the data transmission system is shown. As shown, the data transmission system 270 may include a processor(s) 210. Accordingly, the processor(s) 210 may be a part of the data transmission system 270, or the data transmission system 270 may access the processor(s) 210 through the data buses 211 or another communication pathway. In one or more embodiments, the processor(s) 210 is an application-specific integrated circuit that may be configured to implement functions associated with a connect module 332, an establish module 334, a receive module 336, an acknowledgment module 338, and/or a loss transmission module 340. More generally, in one or more aspects, the processor(s) 210 is an electronic processor, such as a microprocessor that can perform various functions as described herein when loading the modules 332-340 and executing encoded functions associated therewith.

In this example, the data transmission system 270 is disposed within the connected vehicle 102. However, the data transmission system 270 may be disposed of in other non-vehicle devices that can transmit and/or receive messages.

The data transmission system 270 may include a memory 330 that stores the connect module 332, the establish module 334, the receive module 336, the acknowledgment module 338, and the loss transmission module 340. The memory 330 may be a random-access memory (RAM), read-only memory (ROM), a hard disk drive, a flash memory, or other suitable memory for storing the modules 332-340. The modules 332-340 are, for example, computer-readable instructions that, when executed by the processor(s) 210, cause the processor(s) 210 to perform the various functions disclosed herein. While, in one or more embodiments, the modules 332-340 are instructions embodied in the memory 330, in further aspects, the modules 332-340 include hardware, such as processing components (e.g., controllers), circuits, etc. for independently performing one or more of the noted functions.

The data transmission system 270 may include a data store(s) 320 for storing one or more types of data. Accordingly, the data store(s) 320 may be a part of the data transmission system 270, or the data transmission system 270 may access the data store(s) 320 through the data buses 211 or another communication pathway. The data store(s) 320 is, in one embodiment, an electronically based data structure for storing information. In at least one approach, the data store 320 is a database that is stored in the memory 330 or another suitable medium, and that is configured with routines that can be executed by the processor(s) 210 for analyzing stored data, providing stored data, organizing stored data, and so on. In either case, in one embodiment, the data store 320 stores data used by the modules 332-340 in executing various functions. In one embodiment, the data store 320 may be able to store vehicle data 321, rules data 322, environment data 323, and/or data received from or to be transmitted to external devices, such as server(s) and other connected vehicle(s).

The data store(s) 320 may include volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 may be a component of the processor(s) 210, or the data store(s) 320 may be operatively connected to the processor(s) 210 for use thereby. The term "operatively connected" or "in communication with" as used throughout this description, can include direct or indirect connections, including connections without direct physical contact.

In one or more arrangements, the data store(s) 320 can include vehicle data 321. The vehicle data 321 can include information or data about the connected vehicle 102. For instance, the vehicle data 321 can include vehicle type, vehicle identification number (VIN), vehicle IP address, vehicular micro cloud identification, shared identification, model name/number, year of manufacture, vehicle history, vehicle system requirements, vehicle software versions, and map data versions.

In one or more arrangements, the data store(s) 320 can include rules data 322. The rules data 322 can include estimated unused computing resources for a particular geographic location at a particular time of day and the minimum computing resources for forming a vehicular micro cloud 106 at the particular geographic location (and, optionally, at the particular time of day).

In one or more arrangements, the data store(s) can include environment condition data 323. The environment condition data 323 can include information about an upcoming location for the connected vehicle 102, such as weather and traffic conditions, including vehicle collisions, road construction, road closures at the upcoming location, and the like.

The vehicle data 321, rules data 322, and environment condition data 323 may be digital data that describe information used by the data transmission system 270 to determine whether to form and/or join a vehicular micro cloud 106. In some embodiments, the data 321-323 is operable to control whether the data transmission system 270 forms and/or joins the vehicular micro cloud 106. As an example, the data transmission system 270 analyzes the rules data 322 to determine whether the estimated unused computing resources meets or exceeds the minimum computing resources for forming the vehicular micro cloud 106. If the minimum is met or exceeded, then the data transmission system 270 forms the vehicular micro cloud 106. If the minimum is not met or exceeded, then the data transmission system 270 does not form the vehicular micro cloud 106.

As another example, the data transmission system 270 analyzes the vehicle data 321 to determine whether vehicle operating data such as the vehicle software and map versions are current. If the vehicle operating data is no longer current, then the data transmission system 270 may form or join the vehicular micro cloud 106 to receive vehicle operating data from other connected vehicles 102 in the vehicular micro cloud 106. In yet another example, the data transmission system 270 analyzes the vehicle data 321 to determine whether the vehicle systems require data (e.g., a video file, an audio file) to be uploaded or downloaded to the server 104. In such a case, the data transmission system 270 may form or join the vehicular micro cloud 106 to upload or download the data via other connected vehicles 102 in the vehicular micro cloud 106.

As another example, the data transmission system 270 analyzes the environment condition data 323 to determine whether information about the upcoming location is current. If the information is no longer current, then the data transmission system 270 may form or join the vehicular micro cloud 106 to receive current information about the upcoming location from other connected vehicles 102 in the vehicular micro cloud 106.

The connect module 332 may include instructions that, when executed by the processor(s) 210, cause the processor(s) 210 to join a vehicular micro cloud 106.

The connect module 332 may determine whether a vehicular micro cloud 106 exists proximate to the connected vehicle 102. As an example, the connect module 332 may transmit a message to one or more nearby connected vehicles 102, inquiring whether the nearby connected vehicle(s) 102 belong to a vehicular micro cloud 106 and may receive a message, in response, indicating whether the nearby connected vehicle(s) 102 belong to the vehicular micro cloud 106. Additionally and/or alternatively, the connect module 332 may receive a broadcast message from a nearby connected vehicle 102, indicating that the nearby connected vehicle 102 belongs to an existing vehicular micro cloud 106.

The connect module 332 may determine whether the connected vehicle 102 should form or join a vehicular micro cloud 106 based on analyzing data, such as the vehicle data 321, the rules data 322, and the environment condition data 323, as described above. Upon determining that the connected vehicle 102 should join the vehicular micro cloud 106 and that a vehicular micro cloud 106 exists proximate to the connected vehicle 102, the connect module 332 may request to join the existing vehicular micro cloud 106. In the case where the connect module 332 determines that the connected vehicle 102 should join a vehicular micro cloud 106 and that a vehicular micro cloud 106 does not exist proximate to the connected vehicle 102, the connect module 332 may form a new vehicular micro cloud 106.

In the case where the connect module 332 joins an existing vehicular micro cloud 106, the connect module 332 may, as an example, transmit vehicle identifying data such as the geographic location, VIN number, and vehicle IP address of the connected vehicle 102 to the connected vehicles 102 belonging to the existing vehicular micro cloud 106. Additionally, the connect module 332 may receive vehicle identifying data for the connected vehicles 102 belonging to the existing vehicular micro cloud 106, and information about the vehicular micro cloud 106 such as the vehicular micro cloud identification, and the shared identification.

In the case where the connect module 332 forms a new vehicular micro cloud 106, the connect module 332 may, as an example, broadcast an invitation to form a vehicular micro cloud 106 to nearby connected vehicles 102. Upon receiving responses from one or more nearby connected vehicles, the connect module 332 and the nearby connected vehicles may determine characteristics of the vehicular micro cloud 106 such as the type of vehicular micro cloud (e.g., stationary or mobile), communication resources available, minimum and maximum number of members, coordinator vehicle, vehicular micro cloud identification, and shared identification. The members may exchange vehicle identifying data such as geographic locations, VIN numbers, and vehicle IP addresses.

The establish module 334 may include instructions that, when executed by the processor(s) 210, cause the processor(s) 210 to establish a communication connection between the server(s) 104 and the connected vehicle(s) 102.

The establish module 334 may listen for broadcast messages from the server(s) 104, requesting to connect with nearby connected vehicle(s) 102. Upon receiving a message from the server(s) 104, the establish module 334 may transmit a message, which may include vehicle identifying data, the vehicular micro cloud identification and the shared identification to the server(s) 104 to establish a connection between the connected vehicle 102 and the server(s) 104.

The receive module 336 may include instructions that, when executed by the processor(s) 210, cause the processor(s) 210 to receive a first portion of data from the server 104.

The receive module 336 may receive the first portion of data from the server 104 in any suitable format. The receive module 336 may analyze the first portion of data to determine the data source, the destination, the number of portions to be sent, the position number of the first portion relative to the number of portions to be sent, and whether an acknowledgment is being requested.

The receive module 336 may apply any suitable error-detecting algorithm to determine whether the data has been successfully received. Upon determining the first portion of data has been successfully received, the receive module 336 may indicate to the acknowledgment module 338 that the first portion of data has been successfully received.

The receive module 336 may include instructions that, when executed by the processor(s) 210, cause the processor(s) 210 to receive the remaining portion of data from the server 104. Similar to the first portion of data, the receive module 336 may analyze the remaining portion of data to determine the data source, the destination, the number of portions to be sent, the position number(s) of the remaining portion relative to the number of portions to be sent, and whether an acknowledgment is being requested. The receive module 336 may determine whether the remaining portion of data has been successfully received using any suitable error-detecting algorithm. Upon determining that portion(s) of the remaining portion of data have been successfully received, the receive module 336 may indicate to the acknowledgment module that the portion(s) of the remaining portion of data have been successfully received. Upon determining that portion(s) of the remaining portion of data have not been successfully received, the receive module 336 may indicate to the loss transmission module 340 that portion(s) of the remaining portion of data have not been successfully received. The receive module 336 may receive missing portion(s) of data from other connected vehicles 102 in the vehicular micro cloud 106.

The acknowledgment module 338 may include instructions that, when executed by the processor(s) 210, cause the processor(s) 210 to, in response to successfully receiving the first portion of data, send acknowledgment data to the server 104. As an option, the acknowledgment module 338 may send acknowledgment data to the server 104 in response to the server 104 requesting acknowledgment and the first portion of data being successfully received. More generally, the acknowledgment module 338 may send acknowledgment data to the server 104 in response to the server 104 requesting acknowledgment and the related portion of data being successfully received. The acknowledgment data may include the shared identification and may be of any suitable format.

The loss transmission module 340 may include instructions that, when executed by the processor(s) 210, cause the processor(s) 210 to, to identify a portion of the data that the connected vehicle 102 failed to receive from the server 104, and request the portion of the data from other connected vehicle(s) 102 in the vehicular micro cloud 106.

The loss transmission module 340 may identify the portion(s) of data that the connected vehicle 102 or, more specifically, the receive module 336 failed to receive. The loss transmission module 340 may receive the number of portions of data that were sent and position number(s) of the portions that were successfully received from the receive module. Based on the difference between the number of portions of data that were sent and the position number(s) of the portions that were successfully received, the loss transmission module 340 may identify the position number(s) of the portions that were not successfully received. The loss transmission module 340 may request the missing portion(s) of the data from other connected vehicles 102 in the vehicular micro cloud 106 based on the position number(s) of the missing portions.

The loss transmission module 340 may include instructions that, when executed by the processor(s) 210, cause the processor(s) 210 to receive a request for a portion of the data that other connected vehicle(s) 102 failed to receive from the server 104, and in response to the request, send the portion of the data to the other one or more of the plurality of the connected vehicles 102.

The loss transmission module 340 may receive a request message from other connected vehicle(s) 102 for portion(s) of data that the other connected vehicle(s) 102 failed to receive. The request message may include the position number(s) of the portions that were not successfully received. The loss transmission module 340 may identify the portions of data associated with the position number(s) and determine whether the associated portions of data had been successfully received by the receive module 336. In the case that the associated portions of data had been successfully received by the receive module 336, the loss transmission module 340 may retrieve the associated portion(s) of data and send the associated portion(s) of data to the requesting connected vehicle 102.

Figure 4:
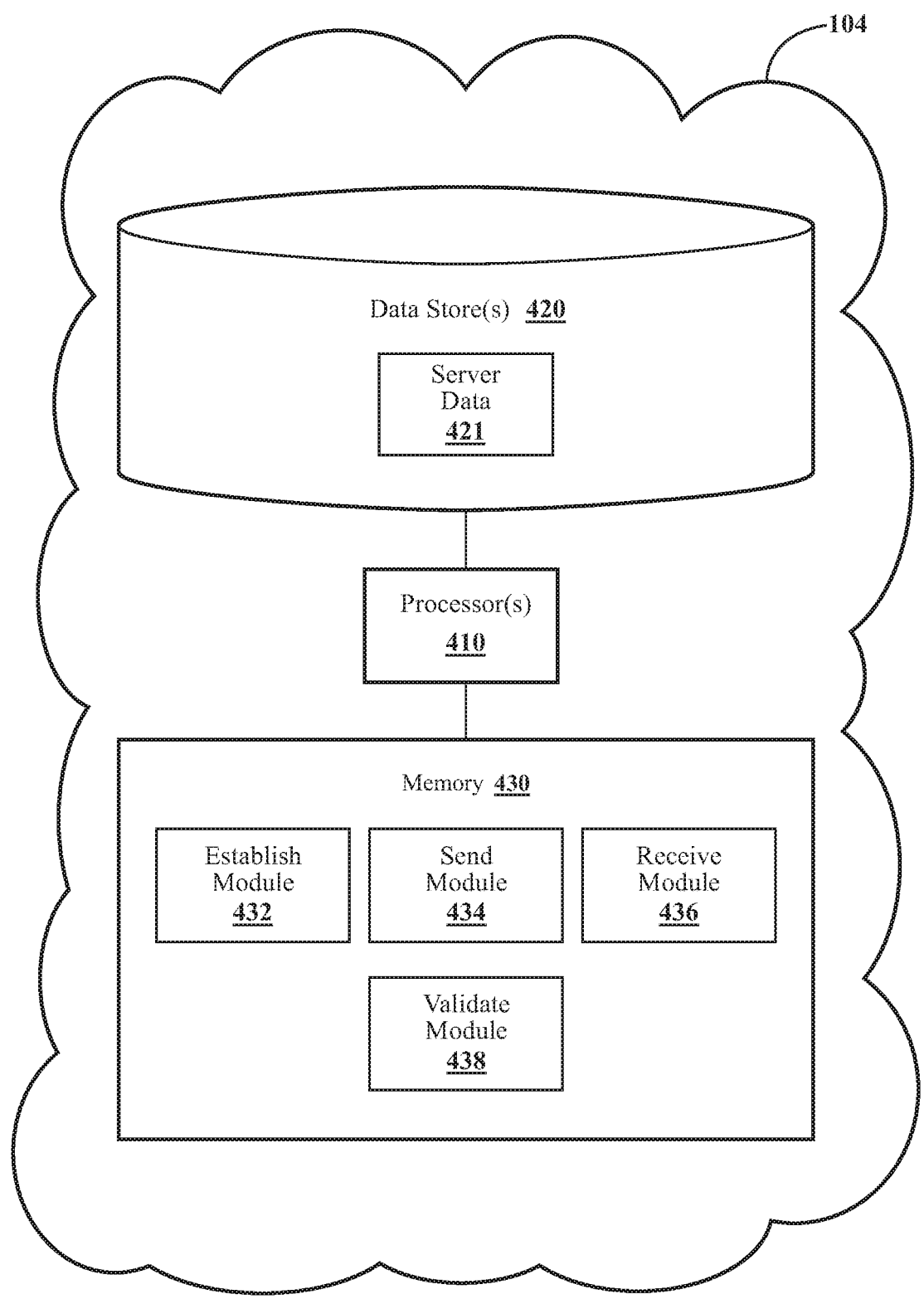
FIG. 4 illustrates a block diagram of a server.

Referring to FIG. 4, an example of a server 104 is shown. The server 104 can include one or more processors 410 and one or more data stores 420. The above description of the processors 210 and the data stores 320 apply equally to the processors 410 and the data stores 420, respectively, and will not be described further to avoid redundancy.

The server 104 can include one or more modules such as an establish module 432, a send module 434, a receive module 436, and a validate module 438. The modules 432-438 can be implemented as computer readable program code that, when executed by a processor, implement one or more of the various processes described herein. One or more of the modules 432-438 can be a component of the processor(s) 410, or one or more of the modules 432-438 can be executed on and/or distributed among other processing systems to which the processor(s) 410 is operatively connected. The modules 432-438 can include instructions (e.g., program logic) executable by one or more processor(s) 410. Alternatively or in addition, one or more data stores 420 can contain such instructions. The data store(s) 420 may include server data 421, which may include server identifying data such as server IP address and server location.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

In one embodiment, the server 104 includes a memory 430 that stores the establish module 432, the send module 434, the receive module 436, and the validate module 438.

The establish module 432 may include instructions that, when executed by the processor(s) 410, cause the processor(s) 410 to establish a communication connection between the server(s) 104 and the connected vehicle(s) 102.

The establish module 432 may broadcast a message, requesting to connect with nearby connected vehicle(s) 102. Additionally or alternatively, the establish module 432 may listen for any messages from nearby connected vehicle(s) 102. In the case where the establish module 432 receives a message from nearby connected vehicle(s) 102, requesting to connect, the establish module 432 may send information such as server identifying information and supported transmission protocols to establish a communication connection between the nearby connected vehicle(s) 102 and the server 104. The establish module 432 may receive information from the nearby connected vehicle 102 such as vehicle identifying information, which may include VIN number, vehicle IP address, and in the case where the connected vehicle 102 is a member of a vehicular micro cloud 106, the vehicle identifying information may include vehicular micro cloud identification and shared identification. The information may include transmission protocols supported by the connected vehicle 102, and whether the acknowledgment data includes the vehicular micro cloud identification and/or the shared identification.

The send module 434 may include instructions that, when executed by the processor(s) 410, cause the processor(s) 410 to send a first portion of data to the connected vehicles 102. The first portion of data may include the data source, the data destination, the number of portions to be sent, the position number(s) of the first portion relative to the number of portions to be sent, and whether an acknowledgment is being requested. As an example, the first portion of data may be in a packet format, and may include a header section and a payload section. The header section may include the data source, the destination, the number of portions to be sent, the position number(s) of the first portion relative to the number of portions to be sent, and whether an acknowledgment is being requested. The payload section may include data associated with an image, a video file, an audio file, and/or a text file.

The send module 434 may include instructions that, when executed by the processor(s) 410, cause the processor(s) 410 to, in response to the acknowledgment data being validated, send the remaining portion of data to the connected vehicle(s) 102. The send module 434 may continuously send the remaining portion of data to the connected vehicle(s) 102 without again requesting acknowledgment. Alternatively, the send module 434 may request acknowledgment for one or more of the remaining portions of data. In such a case and where the send module 434 is sending data to multiple connected vehicles(s) 102, when the acknowledgment data from one of the connected vehicles 102 is received and validated, the send module 434 may continue to send the remaining data. In other words, the acknowledgment data received from at least one connected vehicle 102 applies for all the receiving connected vehicles 102.

The receive module 436 may include instructions that, when executed by the processor(s) 410, cause the processor(s) 410 to, in response to sending the first portion of data, wait for acknowledgment data, and receive acknowledgment data from the one or more of the plurality of connected vehicles 102.

The receive module 436 may wait for a predetermined period of time to receive the acknowledgment data from the connected vehicle(s). In the case where the predetermined period of time expires before the acknowledgment data is received, the receive module 436 may signal to the send module 434 to resend the first portion of data. In the case where the acknowledgment data is received before the predetermined time expires, the receive module 436 can signal to the validate module 438 that the acknowledgment data has been successfully received.

The validate module 438 may include instructions that, when executed by the processor(s) 410, cause the processor(s) 410 to validate the acknowledgment data. The validate module 438 may apply any suitable data transmission algorithms to determine whether the acknowledgment data indicates successful receipt of the first data by the connected vehicle(s) 102. As an example, the validate module 438 may identify the position number(s) of the first portion and source identification in the acknowledgment data. The source identification from the connected vehicle(s) 102 may be the shared identification. The validate module 438 may compare the shared identification received in the acknowledgment data to the shared identification sent by the connected vehicle(s) 102 when the communication connection was being established. In the case that the two shared identifications match, the validate module 438 determines that the acknowledgment data has been successfully validated. In the case where the two shared identifications do not match, the validate module 438 may, as one example, signal to the establish module 432 to re-establish the communication connection between the server 104 and the connected vehicle(s) 102. As another example, the validate module 438 may signal to the send module 434 to re-send the first portion of data.

Figure 5:
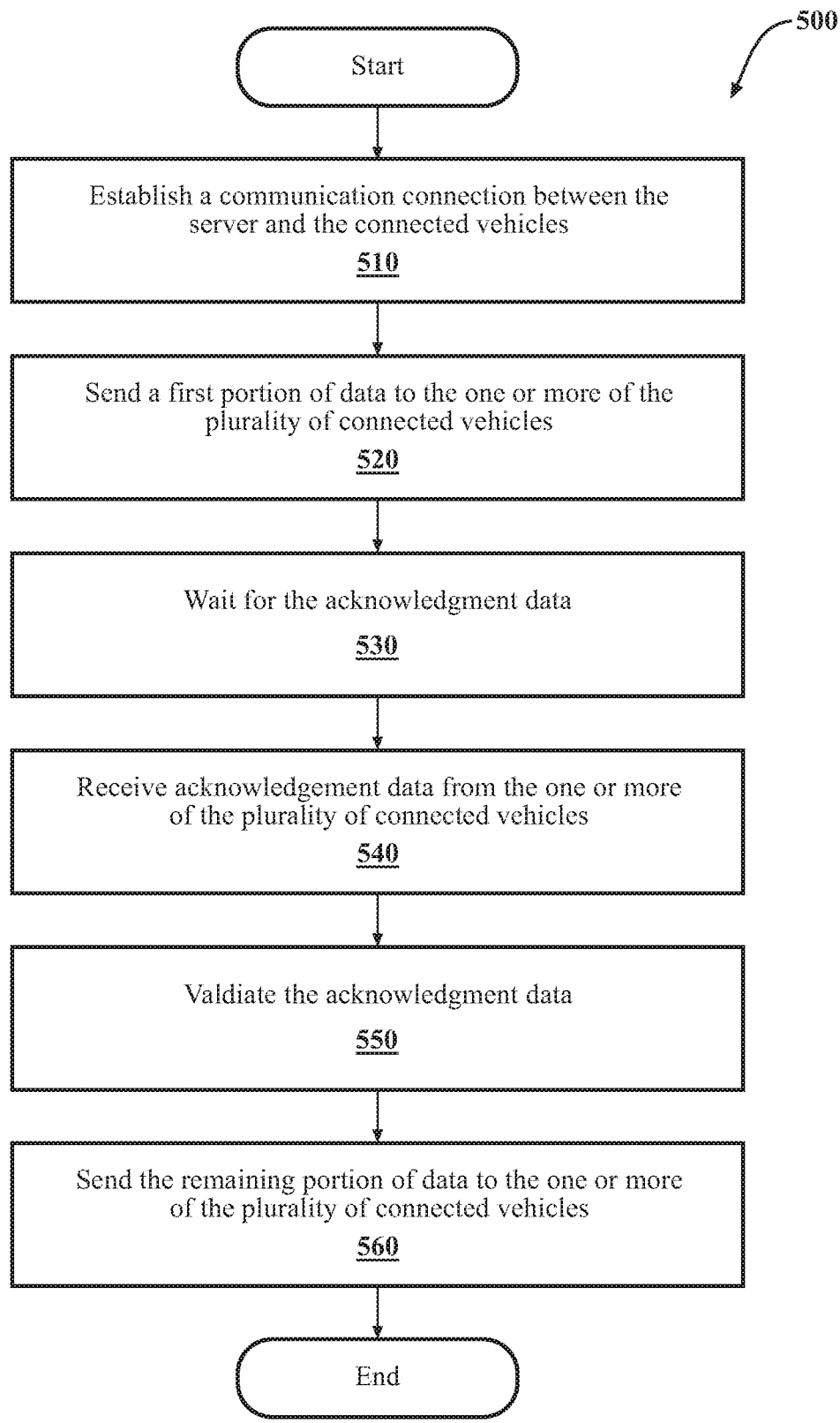
FIG. 5 is an example of a server-based method for transmitting and receiving data.

FIG. 5 illustrates a server-based method 500 for a system transmitting and receiving data between a server 104 and connected vehicle(s) 102. The method 500 will be described from the viewpoint of the server 104 of FIG. 4. However, the method 500 may be adapted to be executed in any one of several different situations and not necessarily by the server 104 of FIG. 4.

The method 500 begins at step 510, wherein the establish module 432 causes the processor(s) 410 to establish a communication connection between the server 104 and the connected vehicle(s) 1. As previously mentioned, the connected vehicles 102 may be members of a vehicular micro cloud 106, and the connected vehicles 102 may have a shared identification. The server 104 may broadcast a message, requesting to connect with nearby connected vehicles 102. In the case that the server 104 receives a message from a nearby connected vehicle 102, requesting to connect, the server 104 may establish the communication with the nearby connected vehicle 102, as described above.

At step 520, the send module 434 causes the processor(s) 410 to send a first portion of data to the connected vehicles 102. The send module 434 may send a first portion of data to one or more of the connected vehicles 102. The first portion of data may include a request for acknowledgment from the receiving connected vehicles 102.

At step 530, the receive module 436 causes the processor(s) to, in response to sending the first portion of data, wait for acknowledgment data. The receive module 436 may wait for a predetermined period of time for the acknowledgment data from the connected vehicles 102 to arrive. The receive module 436 determines whether the acknowledgment data has arrived and/or the predetermined period of time has expired. If the predetermined period of time expires before the acknowledgment data arrives at the server 104, method 500 may return to step 510 or step 520. If the acknowledgment data arrives at the server 104 before the predetermined period of time has expired, the method 500 may move to step 540.

At step 540, the receive module 436 causes the processor(s) 410 to receive acknowledgment data from the connected vehicles 102. In other words, the receive module 436 may receive the acknowledgment data from at least one of the connected vehicles 102. The acknowledgment data may include the shared identification.

At step 550, the validate module 438 causes the processor(s) 410 to validate the acknowledgment. The validate module 438 may validate the acknowledgment data to ensure that the connected vehicle 102 received the first portion of data and can receive the remaining portion of data. As an example and as previously mentioned, the validate module 438 may validate the acknowledgment data by comparing the shared identification received from the connected vehicle 102 earlier to the shared identification in the acknowledgment data. In the case that the two shared identifications match, the method 500 moves to step 560. In the case that the two do not match, the method may return to steps 510 or 520.

At step 560, the send module 434 causes the processor(s) 410 to, in response to the acknowledgment data being validated, send the remaining portion of data to at least one of the connected vehicles 102. The method 500 can end. Alternatively, the method 500 can return to step 510 or some other step.

Figure 6:
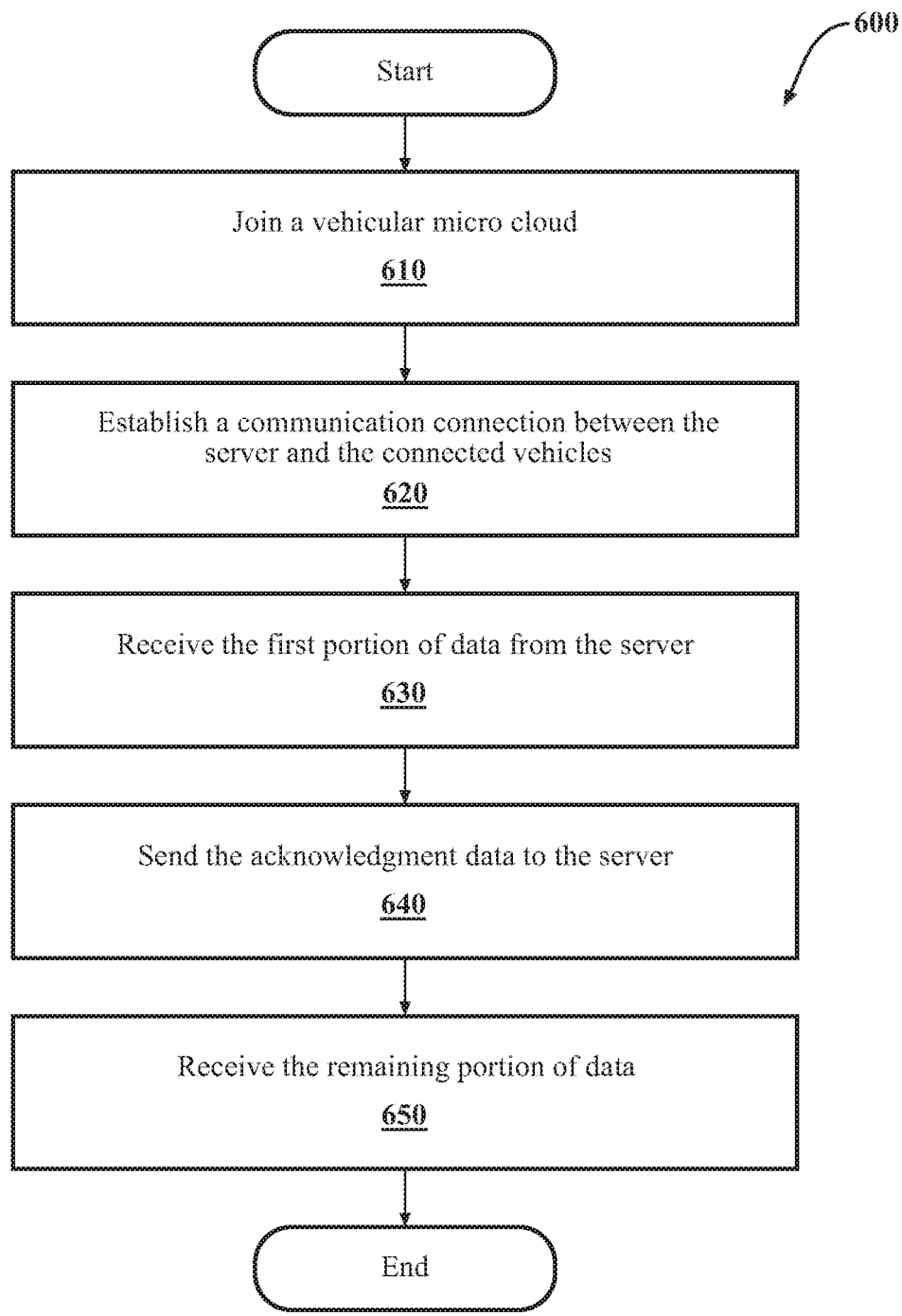
FIG. 6 is an example of a vehicle-based method for transmitting and receiving data.

FIG. 6 illustrates a vehicle-based method 600 for transmitting and receiving data between a connected vehicle 102 and a data transmission system 270. The method 600 will be described from the viewpoint of the connected vehicle 102 of FIG. 2 and the data transmission system 270 of FIG. 3. However, the method 600 may be adapted to be executed in any one of several different situations and not necessarily by the connected vehicle 102 of FIG. 2 and/or the data transmission system 270 of FIG. 3.

The method 600 begins at step 610, wherein the connect module 332 causes the processor(s) 210 to join a vehicular micro cloud. The connect module 332 may join an existing vehicular micro cloud 106. Alternatively, the connect module 332 may form a new vehicular micro cloud 106. The member vehicles of the vehicular micro cloud 106 may have a shared identification.

At step 620, the establish module 334 causes the processor(s) 210 to establish a communication connection between the server 104 and the connected vehicles 102.

At step 630, the receive module 336 causes the processor(s) 210 to receive, by one or more of the plurality of connected vehicles 102, the first portion of data from the server 104. At step 640, the acknowledgment module 338 causes the processors(s) 210 to, in response to receiving the first portion of data, sending, by the one or more of the plurality of connected vehicles 102, the acknowledgment data to the server 104. At step 650, the receive module 336 causes the processor(s) 210 to receive, by the one or more of the plurality of connected vehicles 102, the remaining portion of data.

Figure 7:
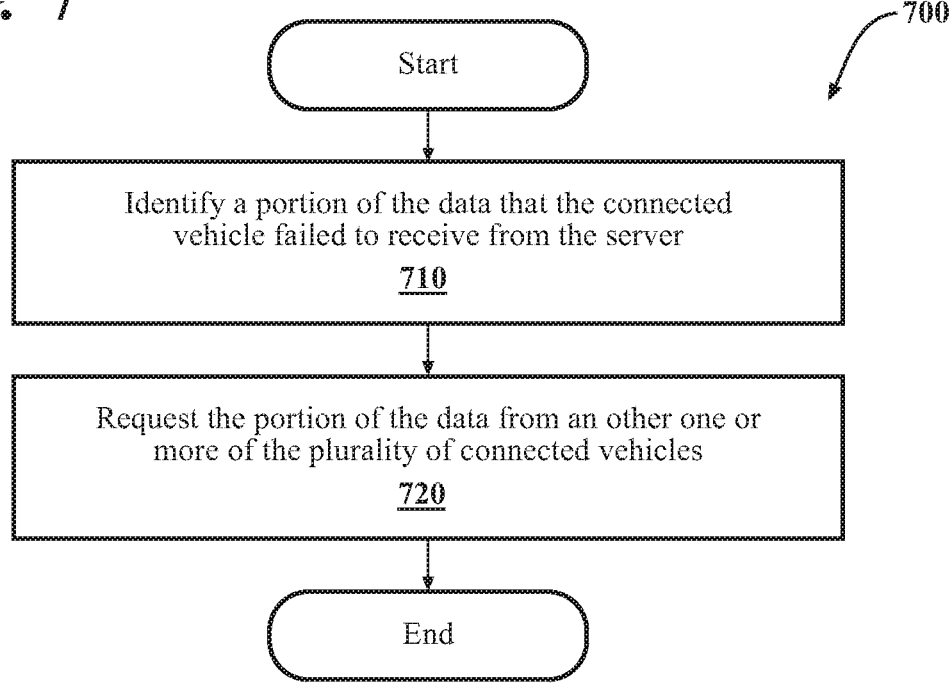
FIG. 7 is an example of a vehicle-based method for requesting lost data.

FIG. 7 illustrates a vehicle-based method 700 for requesting lost data by a connected vehicle and a data transmission system. The method 700 will be described from the viewpoint of the connected vehicle 102 of FIG. 2 and the data transmission system 270 of FIG. 3. However, the method 700 may be adapted to be executed in any one of several different situations and not necessarily by the connected vehicle 102 of FIG. 2 and/or the data transmission system 270 of FIG. 3.

The method 700 begins at step 710, wherein the loss transmission module 340 causes the processor to identify a portion of the data that the connected vehicle 102, or more specifically, the receive module 336 failed to receive from the server 104. At step 720, the loss transmission module 340 causes the processor(s) 210 to request the portion of the data from other connected vehicles 102.

Figure 8:
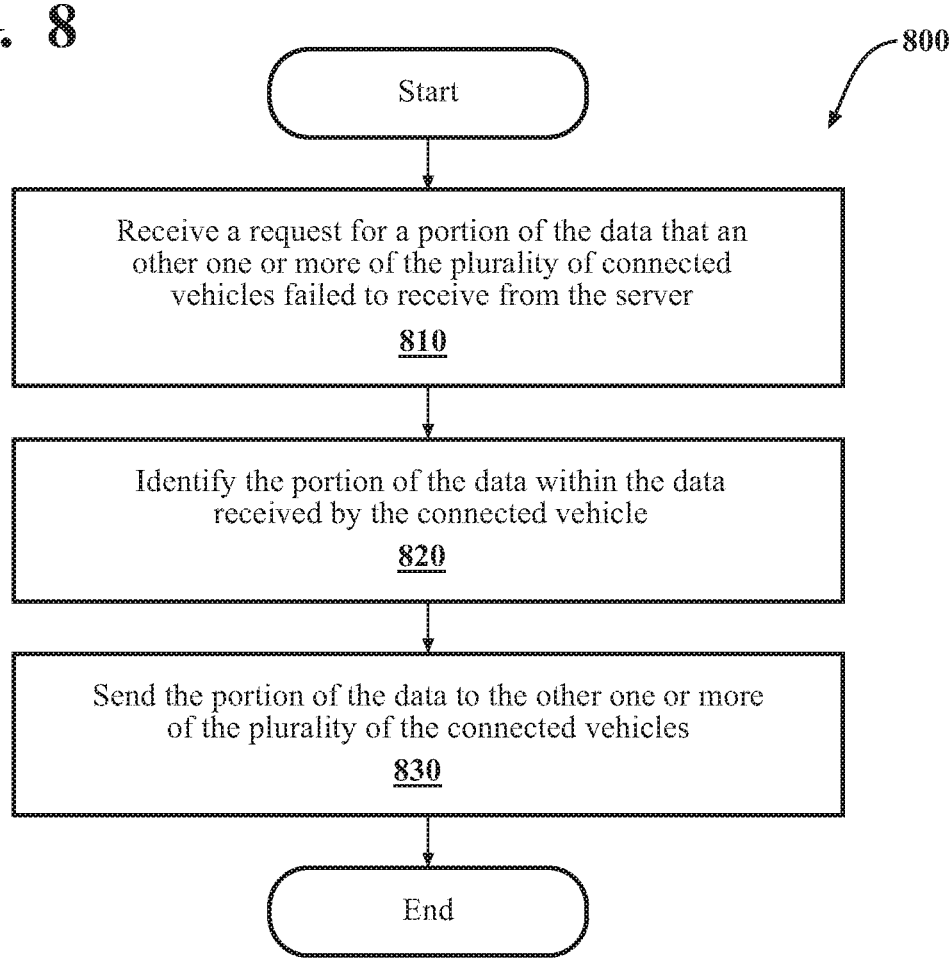
FIG. 8 is an example of a vehicle-based method for transmitting lost data.

FIG. 8 illustrates a vehicle-based method 800 for transmitting lost data by a connected vehicle 102 and a data transmission system 270. The method 800 will be described from the viewpoint of the connected vehicle 102 of FIG. 2 and the data transmission system 270 of FIG. 3. However, the method 800 may be adapted to be executed in any one of several different situations and not necessarily by the connected vehicle 102 of FIG. 2 and/or the data transmission system 270 of FIG. 3.

The method 800 begins at step 810, wherein the loss transmission module 340 causes the processor(s) 210 to receive a request for a portion of the data that another connected vehicles 102 failed to receive from the server 104. At step 820, the loss transmission module 340 causes the processor(s) 210 to identify the portion of the data within the data received by the connected vehicle 102, and more specifically, the receive module 336.

At step 830, the loss transmission module 340 causes the processor(s) 210 to send the portion of the data to the other one or more of the plurality of the connected vehicles 102.

Figure 9A:
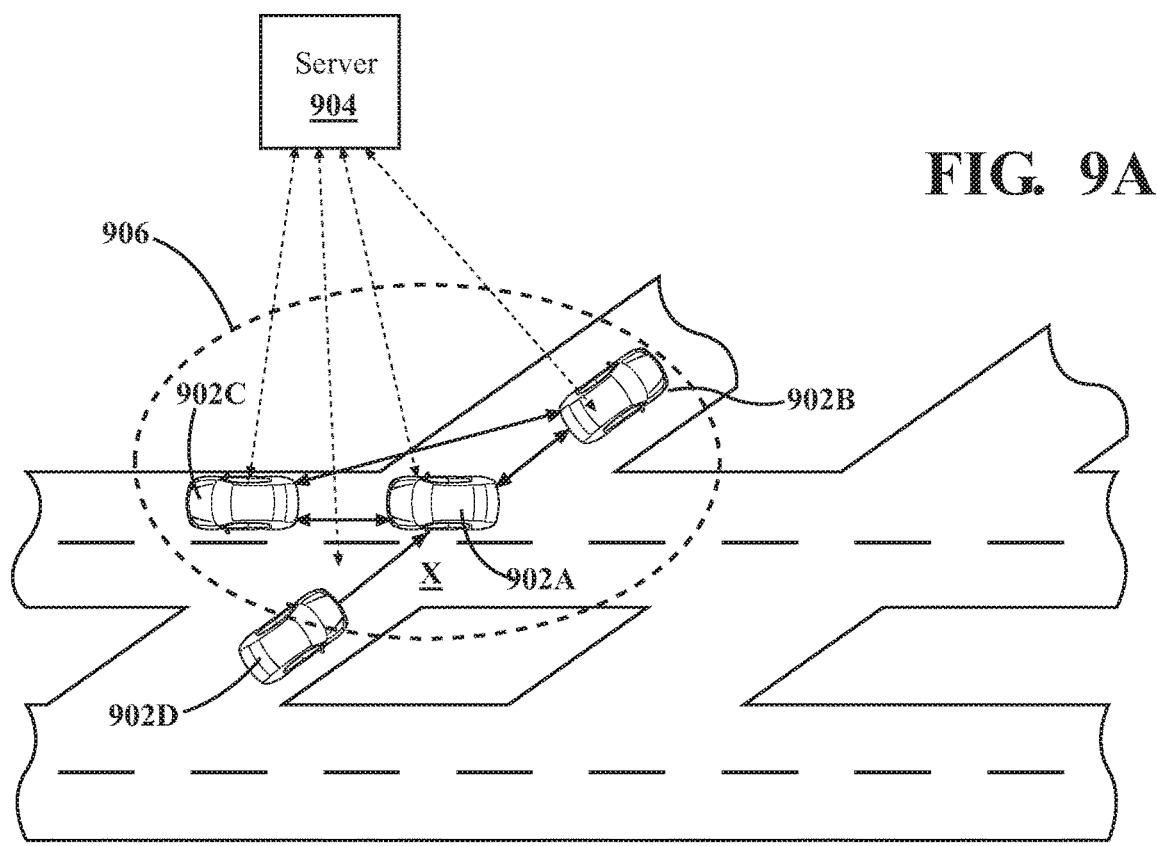
FIGS. 9A-9B are an example of a data transmission scenario.
Figure 9B:
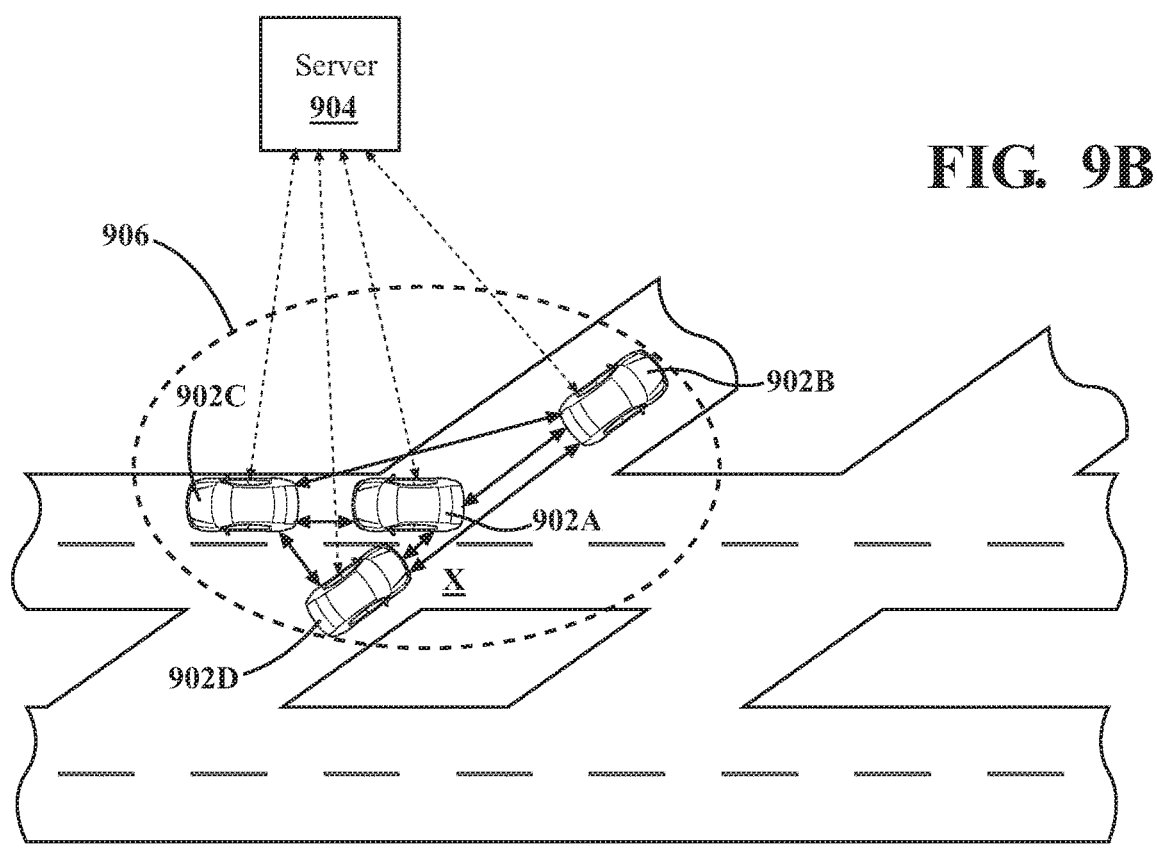

A non-limiting example of the operation of the TCP system 100 and/or one or more of the methods will now be described in relation to FIGS. 9A-9B. FIGS. 9A-9B shows an example of a data transmission scenario. Referring to FIGS. 9A-9B, a first connected vehicle 902A, a second connected vehicle 902B, and a third connected vehicle 902C are members of a vehicular micro cloud 906, while the fourth connected vehicle 902D is not yet a member of the vehicular micro cloud 906.

In FIG. 9A, the fourth connected vehicle 902D can be traveling towards the intersection X. The fourth connected vehicle 902D may send a message with a request to join the vehicular micro cloud 906. The coordinator vehicle, which may be the first connected vehicle 902A, can determine whether the fourth connected vehicle 902D may join the vehicular micro cloud 906. If the coordinator vehicle 902A determines that the fourth connected vehicle 902D may join, the coordinator vehicle 902A and the fourth vehicle 902D may exchange information such as vehicle identifying information, vehicular micro cloud information and specifically, the shared identification.

The server 904, more specifically, the establish module 432 may continuously broadcast an invitation to connect. The fourth connected vehicle 902D may receive the broadcast message and respond with a request to establish a communication connection. The server 904 and the fourth vehicle 902D may exchange information such as server identifying information, vehicle identifying information, vehicular micro cloud information and specifically, the shared identification.

In FIG. 9B, the server 904 may send a first packet of a 128-packet message to the members 902A-D of the vehicular micro cloud 906. Upon receiving the first packet, one of the members 902A-D may send an acknowledgment to the server 904. The server 904 receives the acknowledgment data and validates the information in the acknowledgment to verify that the first packet was received by a member 902A-D of the vehicular micro cloud 906. Upon verifying that the first packet was received, the server 904 proceeds to send the remaining packets of the 128-packet message.

The packets may include information such as a packet sequence number and the number of packets in the message. One or more members 904A-D of the vehicular micro cloud 906 may count the number of packets that have been successfully received. If the number that have been successfully received is less than the number of packets, the member vehicle 904A-D may identify the missing packets based on missing packet sequence numbers. The member vehicle 904A-D may request and receive the missing packets from other member vehicles 904A-D.

As an example, if the second connected vehicle 902B is missing packets with the sequence numbers 24, 48, and 64, the second connected vehicle 902B may send a message to the other connected vehicles 902A, 902C, 902D requesting the missing packets.

The other connected vehicles 902A, 902C, 902D may determine if they successfully received the packets with those sequence numbers. If the packets were successfully received, the other connected vehicles 902A, 902C, 902D may send the packets to the second connected vehicle 902B.

It will be appreciated that arrangements described herein can provide numerous benefits, including one or more of the benefits mentioned herein. For example, arrangements described herein can result in reduced stalling or halting of transmissions between server(s) and member vehicles of a vehicular micro cloud. Arrangements described herein may result in reduced server intelligence and multicast complexity.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for transmitting data between a server and one or more of a plurality of connected vehicles, the method comprising the steps of:
    establishing, by the server, a communication connection between the server and the one or more of the plurality of connected vehicles, the plurality of connected vehicles forming a vehicular micro cloud and having a shared identification;
    sending, by the server, a first portion of data to the one or more of the plurality of connected vehicles, the data having the first portion and a remaining portion;
    receiving, by the server, acknowledgment data from the one or more of the plurality of connected vehicles, the acknowledgment data including the shared identification;

validating, by the server, the acknowledgment data; and
in response to the acknowledgment data being validated, sending, by the server, the remaining portion of the data to the one or more of the plurality of connected vehicles.

2. The method of claim 1, wherein the shared identification is based on at least one of a vehicular micro cloud identification and a vehicle identification.

3. The method of claim 1, further comprising:
in response to sending the first portion of the data, waiting, by the server, for the acknowledgment data.

4. The method of claim 1, wherein the vehicular micro cloud is one of a stationary vehicular micro cloud and a mobile vehicular micro cloud.

5. The method of claim 1, wherein the server is one of an edge server and a cloud server.

6. The method of claim 1, further comprising:
receiving, by one or more of the plurality of connected vehicles, the first portion of the data from the server;
in response to receiving the first portion of the data, sending, by the one or more of the plurality of connected vehicles, the acknowledgment data to the server; and
receiving, by the one or more of the plurality of connected vehicles, the remaining portion of the data.

7. The method of claim 6, further comprising
identifying, by the one or more of the plurality of connected vehicles, a portion of the data that the one or more of the plurality of the connected vehicles failed to receive from the server; and
requesting, by the one or more of the plurality of connected vehicles, the portion of the data from an other one or more of the plurality of connected vehicles.

8. The method of claim 6, further comprising
receiving, by the one or more of the plurality of connected vehicles, a request for a portion of the data that an other one or more of the plurality of the connected vehicles failed to receive from the server; and
sending, by the one or more of the plurality of connected vehicles, the portion of the data to the other one or more of the plurality of the connected vehicles.

9. A system for transmitting data to one or more of a plurality of connected vehicles, the system comprising:
one or more processors; and
a memory in communication with the one or more processors, the memory including:
an establish module having instructions that when executed by the one or more processors cause the one or more processors to establish a communication connection between the system and the one or more of the plurality of connected vehicles, the plurality of connected vehicles forming a vehicular micro cloud and having a shared identification,
a send module having instructions that when executed by the one or more processors cause the one or more processors to send a first portion of data to the one or more of the plurality of connected vehicles, the data having the first portion and a remaining portion,
a receive module having instructions that when executed by the one or more processors cause the one or more processors to receive acknowledgment data from the one or more of the plurality of connected vehicles, the acknowledgment data including the shared identification,
a validate module having instructions that when executed by the one or more processors cause the one or more processors to validate the acknowledgment data, and
the send module having instructions that when executed by the one or more processors cause the one or more processors to, in response to the acknowledgment data being validated, send the remaining portion of the data to the one or more of the plurality of connected vehicles.

10. The system of claim 9, wherein the shared identification is based on at least one of a vehicular micro cloud identification and a vehicle identification.

11. The system of claim 9, wherein the receive module further includes instructions that when executed by the one or more processors cause the one or more processors to, in response to sending the first portion of the data, wait for the acknowledgment data.

12. The system of claim 9, wherein the vehicular micro cloud is one of a stationary vehicular micro cloud and a mobile vehicular micro cloud.

13. The system of claim 9, wherein the system is one of an edge server and a cloud server.

14. A data transmission system for a connected vehicle, the data transmission system comprising:
one or more processors; and
a memory in communication with the one or more processors, the memory comprising:
a connect module having instructions that when executed by the one or more processors cause the one or more processors to join a vehicular micro cloud, the vehicular micro cloud having a plurality of connected vehicles including the connected vehicle, the plurality of connected vehicles having a shared identification,
a receive module having instructions that when executed by the one or more processors cause the one or more processors to receive a first portion of data from a server, the data having the first portion and a remaining portion,
an acknowledgment module having instructions that when executed by the one or more processors cause the one or more processors to, in response to receiving the first portion of data, send acknowledgment data to the server, the acknowledgment data including the shared identification, and
the receive module having instructions that when executed by the one or more processors cause the one or more processors to receive the remaining portion of the data.

15. The data transmission system of claim 14, wherein the shared identification is based on at least one of a vehicular micro cloud identification and a vehicle identification.

16. The data transmission system of claim 14, wherein the vehicular micro cloud is one of a stationary vehicular micro cloud and a mobile vehicular micro cloud.

17. The data transmission system of claim 14, wherein one or more of the first portion of the data and the remaining portion of the data is one or more data packets.

18. The data transmission system of claim 14, wherein the server is one of an edge server and a cloud server.

19. The data transmission system of claim 14, wherein the memory further comprises a loss transmission module comprising instructions that when executed by the one or more processors cause the one or more processors to:
identify a portion of the data that the connected vehicle failed to receive from the server; and request the portion of the data from an other one or more of the plurality of connected vehicles.

20. The data transmission system of claim 14, wherein the memory further comprises a loss transmission module comprising instructions that when executed by the one or more processors cause the one or more processors to:
  receive a request for a portion of the data that an other one or more of the plurality of connected vehicles failed to receive from the server; and
  in response to the request, send the portion of the data to the other one or more of the plurality of the connected vehicles.

\* \* \* \* \*